(12) United States Patent
Schmidt

(10) Patent No.: US 9,035,219 B1
(45) Date of Patent: May 19, 2015

(54) ARC WELDING MACHINE ADAPTED FOR REMOTE CONTROLLED CURRENT ADJUSTMENT

(71) Applicant: Doug Schmidt, Sharon, KS (US)

(72) Inventor: Doug Schmidt, Sharon, KS (US)

( * ) Notice: Subject to any disclaimer, the term of this patent is extended or adjusted under 35 U.S.C. 154(b) by 236 days.

(21) Appl. No.: 13/654,758

(22) Filed: Oct. 18, 2012

(51) Int. Cl.
B23K 9/10 (2006.01)

(52) U.S. Cl.
CPC .......................................... B23K 9/10 (2013.01)

(58) Field of Classification Search
CPC ........................................................... B23K 9/10
USPC .............................. 219/132, 130.1; 340/12.22
See application file for complete search history.

(56) References Cited

U.S. PATENT DOCUMENTS

| | | | |
|---|---|---|---|
| 2,526,597 A | 10/1950 | Winslow | |
| 3,477,005 A * | 11/1969 | Weems | 318/266 |
| 4,216,367 A | 8/1980 | Riseberg | |
| 4,216,368 A * | 8/1980 | Delay | 219/132 |
| 4,410,789 A | 10/1983 | Story | |
| 4,467,174 A * | 8/1984 | Gilliland | 219/132 |
| 5,864,117 A | 1/1999 | Neisley et al. | |
| 6,531,673 B2 | 3/2003 | Fedorcak | |
| 6,570,132 B1 | 5/2003 | Brunner et al. | |
| 7,926,118 B2 * | 4/2011 | Becker et al. | 2/8.2 |
| 2008/0116185 A1 | 5/2008 | Luck et al. | |
| 2009/0200283 A1 | 8/2009 | Bland et al. | |
| 2011/0049116 A1 | 3/2011 | Rappi et al. | |

FOREIGN PATENT DOCUMENTS

| | | |
|---|---|---|
| CN | 2384730 Y | 8/1999 |
| CN | 2730538 Y | 9/2004 |
| CN | 2761338 Y | 1/2005 |
| EP | 575082 A2 | 12/1993 |
| EP | 1112800 B2 | 12/2005 |
| FR | 2135780 A5 | 12/1972 |
| GB | 1006808 A | 10/1975 |
| JP | 3275278 A | 5/1991 |
| JP | 2007160320 A | 6/2007 |
| KR | 100727643 B1 | 2/2005 |

* cited by examiner

*Primary Examiner* — Brian Jennison
(74) *Attorney, Agent, or Firm* — Kenneth H. Jack; Davis & Jack, L.L.C.

(57) ABSTRACT

An arc welding assembling including a case having a control panel plate having a plurality of apertures, and having front and rear sides; a mounting plate; a plurality of mounting posts interconnecting the control panel plate and the mounting plate, and positioning the mounting plate rearwardly from the control panel plate to define a drive linkage space; a rheostat having an axle and being supported upon the mounting plate, the rheostat's axle extending forwardly through the drive linkage space and protruding from one of the control panel plate's apertures; a turn handle attached to the rheostat axle's forward end; an electric motor supported upon the mounting plate, and having a rotary output within the drive linkage space; a power transfer assembly within the drive linkage space for translating rotary power from the electric motor to the rheostat's axle; and a remote switching transmitter and radio receiver combination connected operatively to the electric motor.

15 Claims, 5 Drawing Sheets

ARC WELDING MACHINE ADAPTED FOR REMOTE CONTROLLED CURRENT ADJUSTMENT

FIELD OF THE INVENTION

This invention relates to welding. More particularly, this invention relates to arc welding machines and electro-mechanical equipment and components associated with arc welding machines.

BACKGROUND OF THE INVENTION

Welders who perform arc welding through the use of arc welding machines or rigs commonly have a need of performing fine tuning or precising adjustment of the electrical current or amperage within the arc welding electrical circuit. Where molten metal temperatures between a stick welding or arc welding rod and a metal work piece become excessive, the welder may desirably effect a current reducing adjustment through actuation of current adjusting controls which are typically presented upon the arc welding machine's control panel. Alternatively, where such molten metal temperatures are deficient, current may similarly be increased.

In performing such steps incident to increasing or decreasing the current within an arc welding circuit, such welder often is undesirably required to interrupt ongoing welding and walk to and from the welding machine, in order to directly manipulate the machine's current adjustment controls. Mechanically imposed requirements for performing such current adjustment steps undesirably waste time and effort, and undesirably slow the progress of arc welding.

The instant inventive arc welding assembly solves or ameliorates the problems and deficiencies discussed above by adapting an arc welding machine for actuation via remote radio control. The instant invention achieves such objectives with significant cost economies and with significant parts and components economies by incorporating within an arc welding machine's typically previously existing or OEM current control components adaptive structures which allow the amperage of the arc welding circuit to be remotely controlled.

BRIEF SUMMARY OF THE INVENTION

A structural component of the instant inventive arc welding assembly comprising a case having a control panel plate, such plate having a plurality of apertures, a front side, and a rear side. In a one embodiment, the case component encloses and houses both an internal combustion engine and an electric generator (driven by the engine) which produces welding current electrical power. Suitably, the case component may alternatively house electric transformer components for converting an 120 or 240 alternating current power input, or a three phase input, to a welding current electrical output. Where the case houses electrical generator and internal combustion motor components, the case typically constitutes a heavy equipment item which may be portably carried upon a truck or trailer bed.

Further structural components of the instant inventive arc welding assembly comprise a mounting plate and first mounting means, the mounting plate and the case's control panel plate being interconnected by the first mounting means. In a preferred embodiment, the first mounting means comprise a plurality of bolt configured mounting posts which rigidly position the mounting plate immediately behind or rearwardly from the control panel plate. Through such component positioning, the first mounting means advantageously defines a drive linkage housing space between a forward face of the mounting plate and a rearward face of the control panel plate. In the preferred embodiment, the first mounting means' rearward positioning of the mounting plate assures that the "add on" or adaptive components of the instant inventive assembly are housed within a weather protected interior space.

A further structural component of the instant inventive arc welding assembly comprises a rotary selection rheostat which is supported by second mounting means upon the rearwardly positioned mounting plate. In the preferred embodiment, such rheostat is of the type which toroidally configures its progressive contact resistor, and which includes a rotating movable electrical contact member which turns upon a central axle. In the preferred embodiment, the rheostat's central axle extends forwardly through an aperture within the mounting plate, thence extends forwardly across the drive linkage space, and then forwardly protrudes through an aperture within the control panel plate. In the preferred embodiment, the same mounting bolts and bolt receiving apertures which served as OEM equipment for mounting the rheostat upon the rear face of the control panel plate are additionally utilized for mounting the mounting plate at its rearwardly displaced and drive linkage space defining position. Also, in the preferred embodiment, the rheostat's axle further forwardly extends through an OEM aperture within the control panel plate to forwardly support an OEM manually turnable handle. As used herein, the term "rheostat" is intended as representing and including other electrical current controlling devices such as potentiometers.

A further structural component of the instant inventive arc welding assembly comprises an electric motor which is preferably directly supported upon the mounting plate. In the preferred embodiment, the electric motor comprises a reversible DC 12-volt motor, and such motor preferably has a rotary output drive axle which extends into the drive linkage space.

A further structural component of the instant inventive arc welding assembly comprises a power transfer assembly which is preferably mounted at and housed within the invention's drive linkage space. Such assembly preferably operatively interconnects the rheostat's axle and the electric motor's rotary output drive to translate the motor's rotary power to the rheostat's electrical contact turning axle. In the preferred embodiment, the power transfer assembly comprises a combination of a pair of toothed sprockets and a continuous loop roller chain. Suitably, the power transfer assembly may alternatively comprise commonly known power transferring combinations such as belt and pulley combinations, toothed belt and gear combinations, and variously configured gear trains.

In the preferred embodiment, the axle mount of one of the preferably provided sprockets comprises a frictional slip clutch which facilitates continued motor and sprocket turning in the event the rheostat's electrical contact rotates to one of its stops or turning limits. Such slip clutch adaptation advantageously prevents motor stalling and overheating upon reaching such limit, and provision of such slip clutch further advantageously facilitates manual turning of the rheostat's turn handle and axle without simultaneously turning the sprocket, roller chain, and electric motor components.

Further structural components of the instant inventive arc welding assembly comprise remote electric motor switching means which are connected operatively to the electric motor. In a preferred embodiment, a reversing polarity remote control receiver unit is provided, such receiver unit preferably being installed upon the mounting plate, and being interposed within the electric motor's power circuit. In the preferred embodiment, such receiver is actuatable for reversing motor control via a separate battery powered two function radio transmitter.

In a preferred embodiment, such transmitter has an effective range at least as long as common lengths of arc welding cables. In order to enhance such function, the instant remote control receiver preferably includes an antenna which may be mounted to an exterior surface of the arc welder case. An antenna lead preferably extends into the case's interior for signaling electrical communication with the receiver's antenna input.

In a preferred embodiment of the instant invention, the remote switching means configure the transmitter component as a small fob type remote control, which is tactily actuatable. The fob remote control preferably has two actuation buttons, a current enhancement function button and a current suppression function button. In the instant invention, the switching means preferably ergonomically incorporate and include a welder's helmet, and the preferred fob type remote control is conveniently and ergonomically attached to the helmet at an inner neckline surface.

In operation of the instant invention, and assuming a provision of preferred components and arrangements of components as described above, a welder may, during an ongoing process of arc welding and without any significant welding interruption, raise a hand to the lower neckline edge of his or her welding helmet. Such welder may reach fingers therein to the remote control fob component attached at that interior location. Thereafter, the welder may easily and conveniently depress the fob's "current up" adjustment button or the fob's "current down" adjustment button. In the preferred embodiment, pressing either of such buttons transmits a discreet signal to the receiver, which pulse actuates the reversible DC electric motor. In response, the motor turns a short and preferably calibrated angular distance. Such short motor actuating pulse advantageously produces small incremental adjustments of arc welding amperage.

Accordingly, objects of the instant invention include the provision of an arc welding assembly which incorporates structure as described above, and which arranges those structures in relation to each other in manners described above, for the achievement of objects and benefits described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
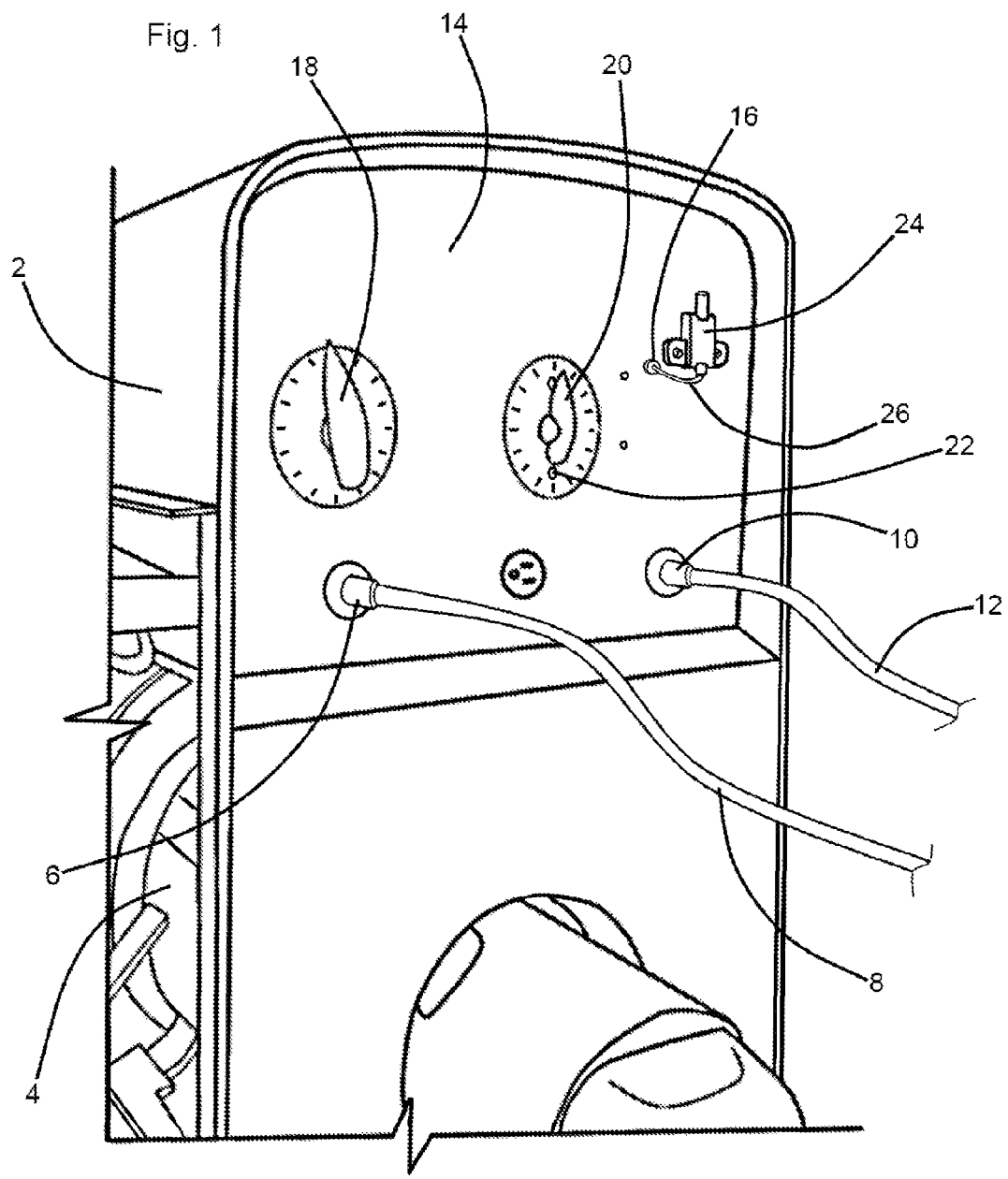
FIG. 1 is a partial perspective view of the front exterior of a case component of the instant inventive assembly.

Referring now to the drawings and in particular to Drawing FIG. 1, the instant inventive arc welding assembly preferably comprises a durable metal equipment case 2, such case commonly protectively housing internal combustion motor and electrical generator components 4. The case 2 preferably has a forward control panel plate 14, such plate 14 conventionally supporting and having mounted thereto a gross welding amperage or current control 18, a fine current control 20, a ground or negative electrode terminal 6, an attached ground cable 8, and a positive electrode terminal 10 with attached cable 12. An electrode holder and welding stick or arc welding rod combination (not depicted within views) is typically attached to the distal end of cable 12 for use in arc welding of metal work pieces.

Figure 4:
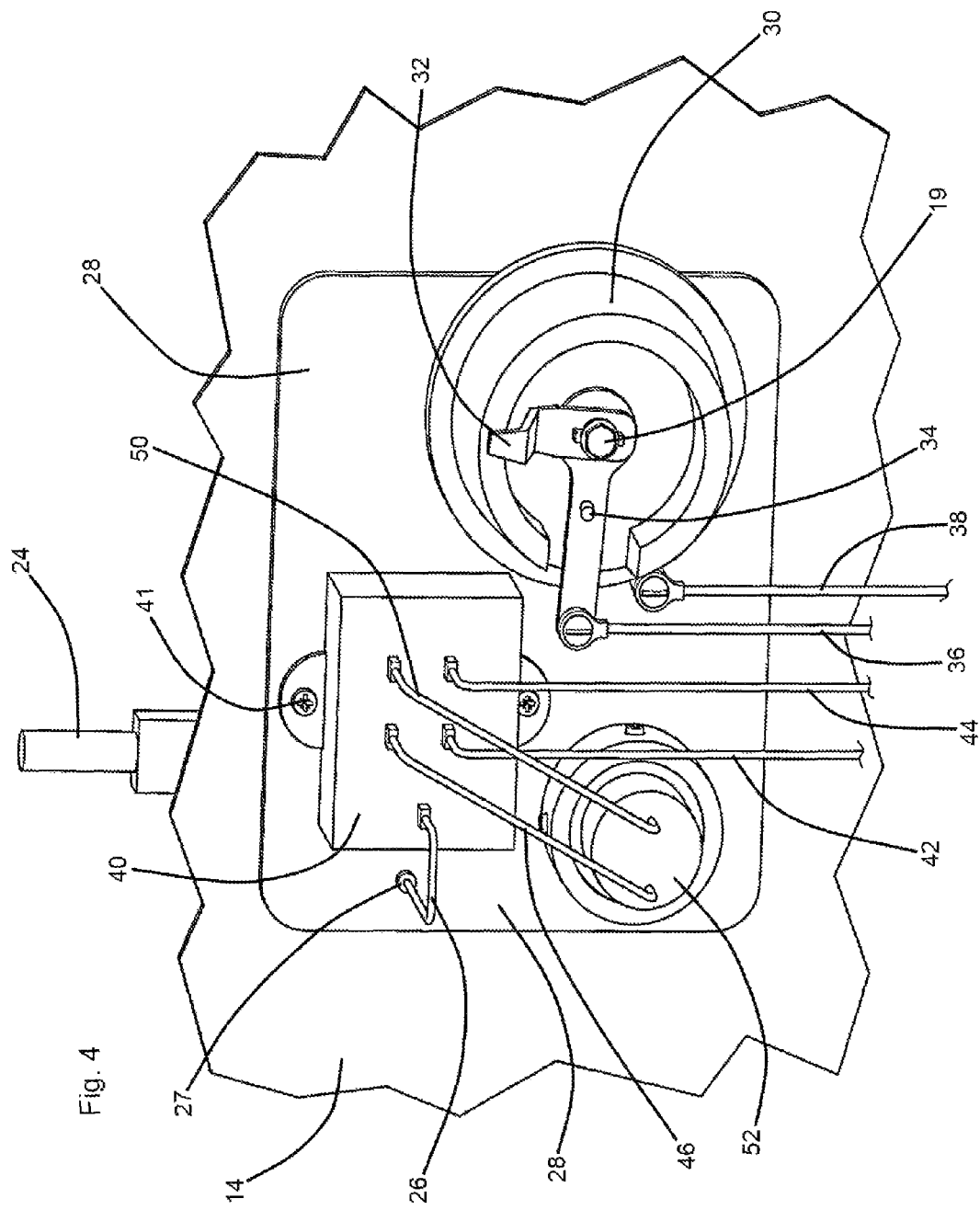
FIG. 4 is a reverse view of the structure depicted in FIG. 3.
Figure 5:
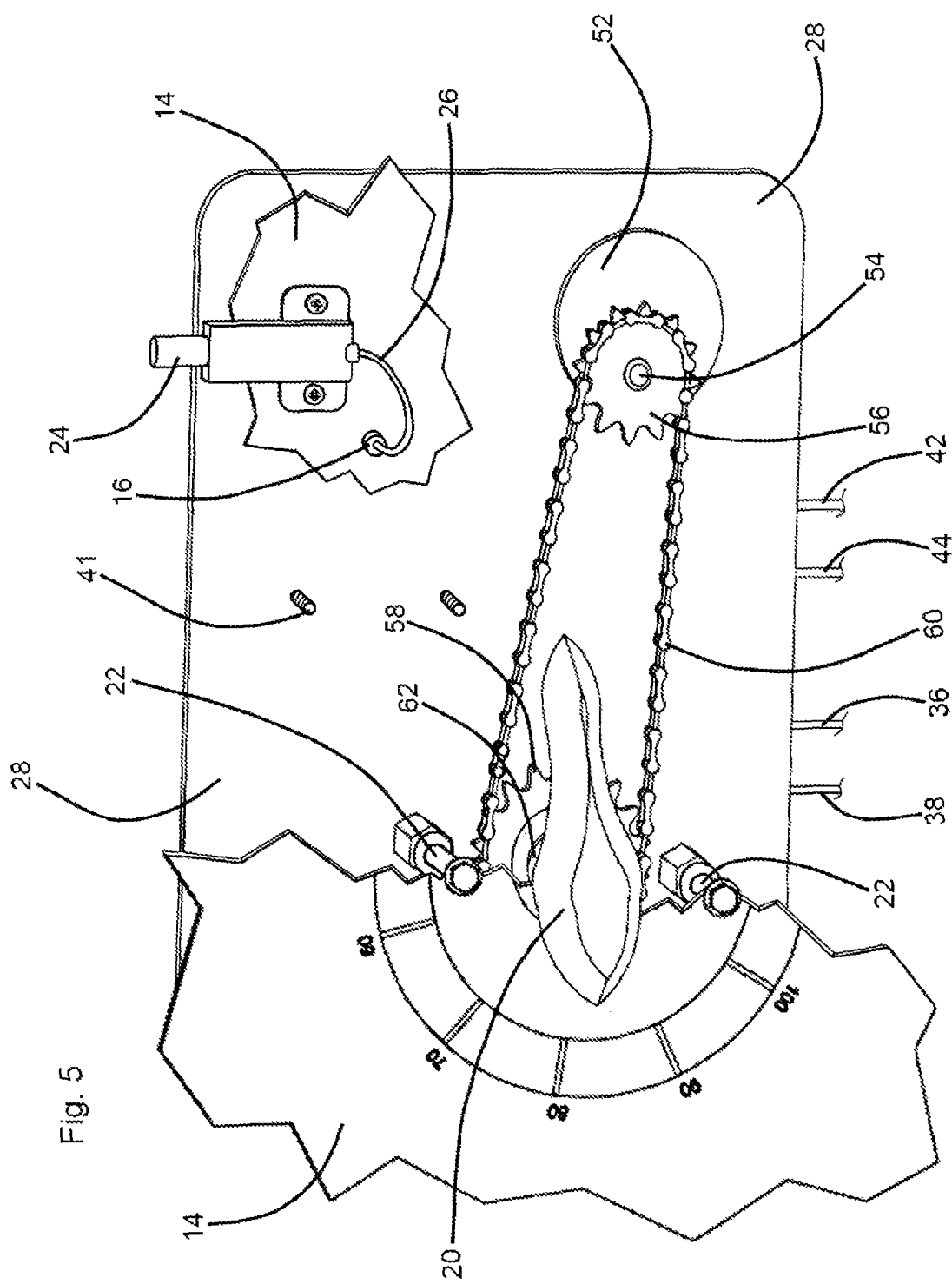
FIG. 5 redepicts FIG. 3, the view of FIG. 5 "cutting away" portions of a control panel plate for explanation of underlying structures.

Referring simultaneously to FIGS. 4 and 5, a mounting plate 28 is provided, such plate preferably being interconnected with the control panel plate 14 by first mounting means. In a preferred embodiment, the first mounting means comprise a plurality of spacer posts 22,41 which rigidly and securely position the mounting plate 28 rearwardly from the control panel plate 14. In a preferred embodiment, the mounting plate rearward displacement forms a gap between ¾" and 1", such gap defining a drive linkage housing space.

Referring to FIG. 4, the instant inventive assembly further comprises a rotary selection rheostat 30 which preferably toroidally configures its progressive current varying resistor. A rotating or pivoting contact electrode 32 operatively turns over the resistor in unison with turns of axle 19. Referring further simultaneously to FIG. 5, second mounting means for securing the rheostat 30 upon the mounting plate 28 are provided. In a preferred embodiment, such rheostat attaching second mounting means comprise and incorporate the first mounting means' posts 22 which rigidly support the mounting plate 28. Configuring the components of the instant invention to allow such first and second mounting means to coincide advantageously utilize welding machine OEM equipment as components of the function enhancing adaptations of the instant inventive assembly. Referring further simultaneously to FIG. 1, the rheostat 30 is preferably incorporated into the arc welding power circuit (including electrodes 6 and 10 and cables 8 and 12) via electrically conductive leads 36 and 38. A rotation limit or stop 34 is provided to mechanically require that contact 32 move orbitally between low current and high current settings.

Referring simultaneously to FIGS. 4 and 5, the instant inventive assembly preferably further includes a DC electric motor 52 (preferably 12-volt), such motor preferably being directly mounted upon and supported by mounting plate 28. A power transfer assembly preferably spans between and operatively interconnects the axle 19 of rheostat 30 and the power output axle 54 of the motor 52. A pair of radially toothed sprockets 56 and 58 which engage a continuous loop roller chain 60 are provided for translating rotary power from the motor 52 to the axle 19 and to the contact 32 of the rheostat 30. In the preferred embodiment, a frictional slip clutch 62 is interposed as an additional rotary connection between sprocket 58 and the rheostat axle 19. Suitably, such slip clutch may alternatively engage the axle 54 of motor 52. Upon turning or counter-turning motion of the motor 52 resulting in impingement of the rheostat's contact 32 with rotation stop 34, the slip clutch 62 allows the motor axle 54, sprocket 56, roller chain 60, and sprocket 58 to continue their rotary motions while the rheostat axle 19 and contact 32 remain motionless. Accordingly, the slip clutch 62 guards against over-heating and burnout of motor 52 upon reaching the rheostat's low amperage or high amperage limit. The slip clutch 62 also advantageously allows selector handle 20 to be directly manually turned for fine current adjustments without simultaneously turning the roller chain, sprockets, and motor.

The sprockets and roller chain assembly 56,58,60 depicted in FIG. 5 is representative of other commonly known rotary power translating assemblies which may be suitably substituted, such as belt and pulley combinations and gear trains.

Further structural components of the instant inventive arc welding assembly comprise remote switching means which are connected operatively for reversible actuating control of the electric motor 52. In a preferred embodiment, the remote switching means comprise a 12-volt reversing polarity remote control receiver unit 40 which is preferably mounted upon mounting plate 28 by mounting screws 41. Such mounting screws 41 may advantageously be configured to further forwardly extend across the drive linkage space for mounting engagement with the control panel plate 14, such mounting screws 41 thereby providing the mounting plate 28 further support. 12-volt electric power to the preferably reversible electric motor 52 is provided by conductive leads 42 and 44 which reside within an electrical circuit including the remote control 40. Power from receiver 40 is transmitted to the electric motor 52 via conductive leads 46 and 50.

Referring simultaneously to FIGS. 4 and 5, the remote switching means preferably further comprise an antenna 24 and an electrically conductive antenna lead 26 which communicates radio signals to the receiver 44. In the preferred embodiment, the antenna lead 26 extends from antenna 24 through a rubber spacer sealed aperture 16 within the control panel plate 14, and thence through a second rubber spacer sealed aperture 27 within mounting plate 28 to terminate at and communicate with the remote control receiver component 40. The antenna 24 is preferably mounted at an upper and forward location upon the case 2 for enhanced radio reception.

Figure 2:
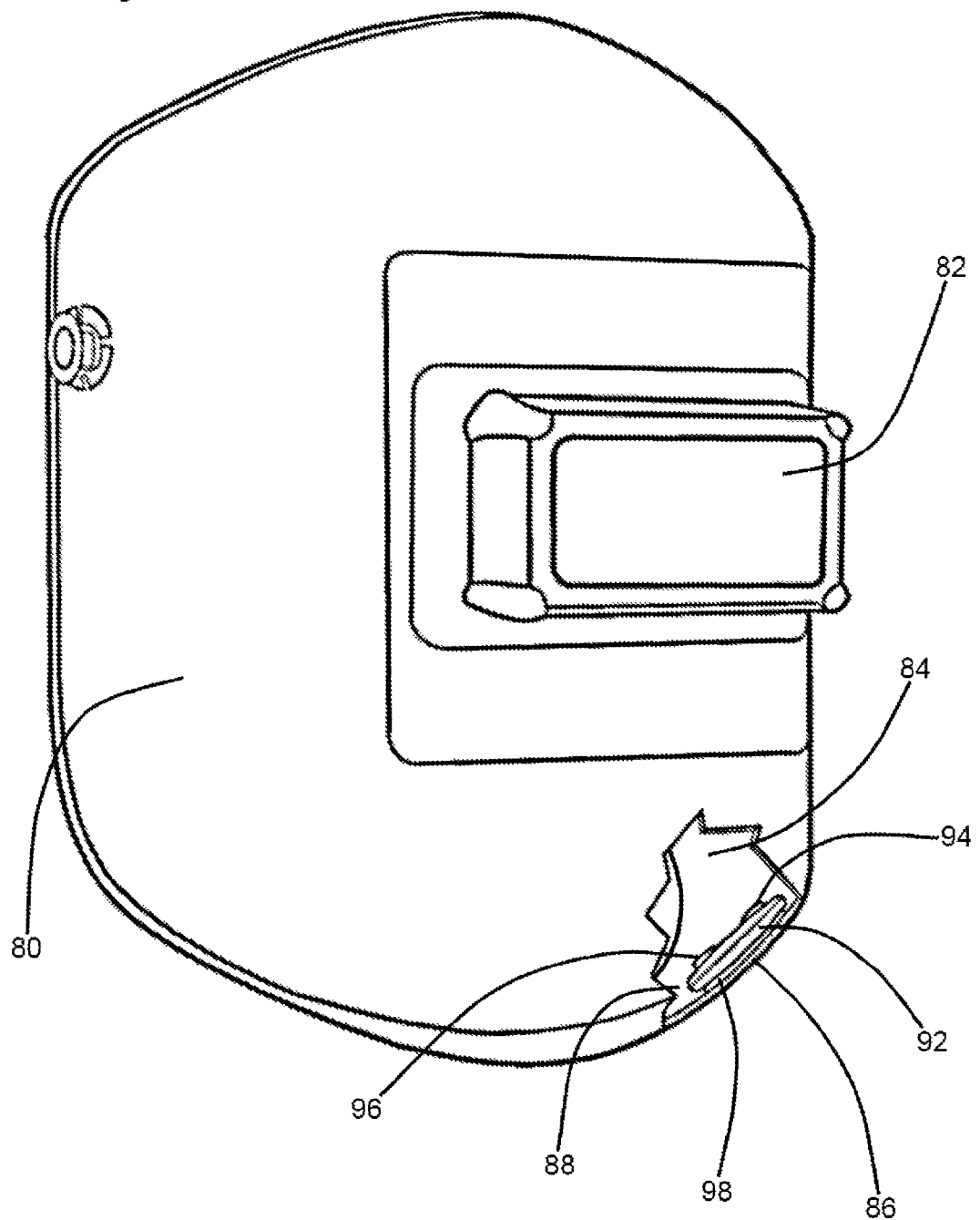
FIG. 2 is a perspective view of remote switching means components (particularly switching means welding helmet and transmitter fob components) of the instant inventive assembly.
Figure 3:
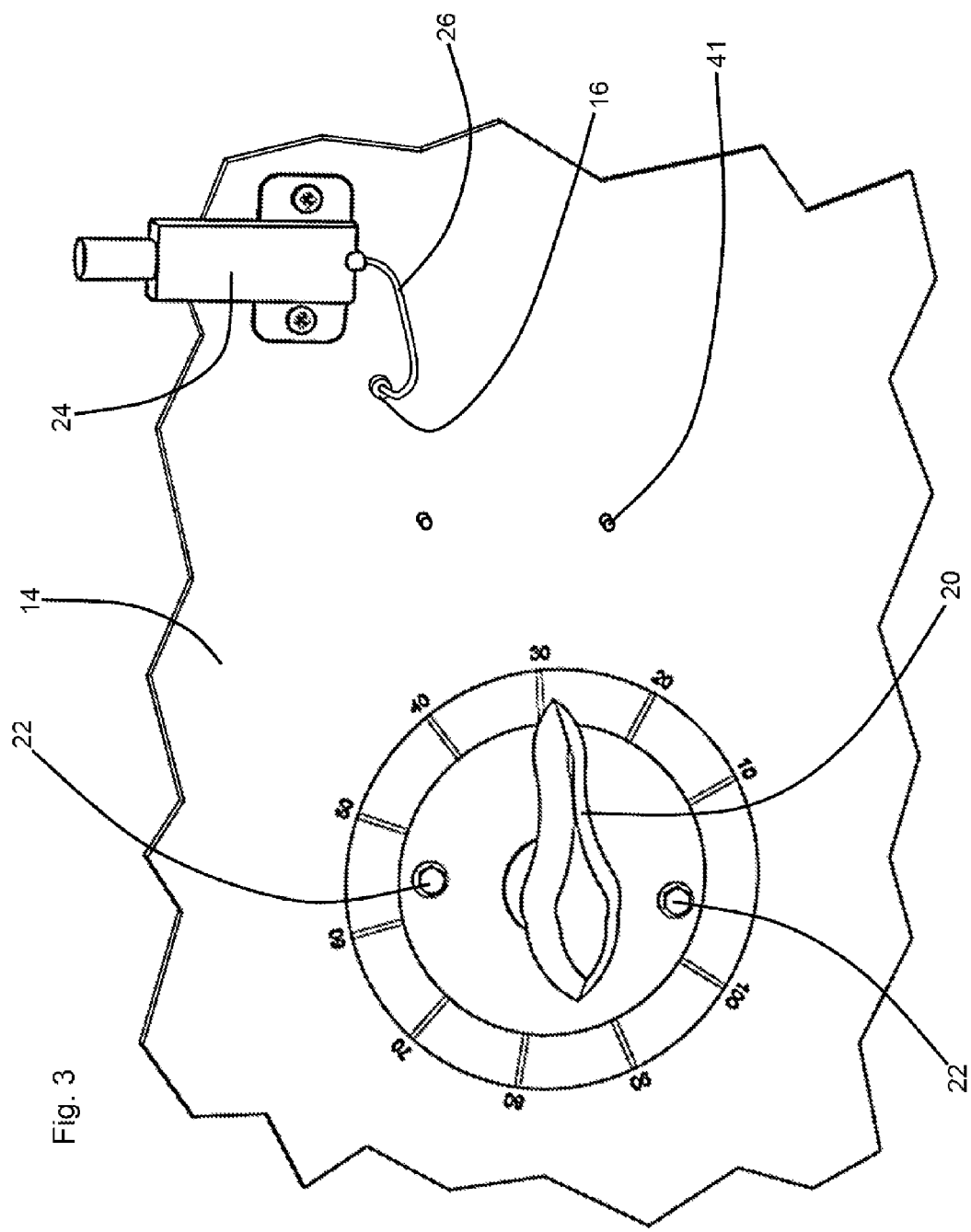
FIG. 3 is a magnified view of a portion of the structure depicted in FIG. 1.

In a preferred embodiment of the instant invention, the remote switching means comprise a compact battery powered two function radio transmitter which is adapted to provide actuating signals to the remote control receiver unit 40. Referring to FIG. 2, such transmitter component preferably comprises a small remote control fob 92 which includes a current enhancing or "current up" button 94 and a current suppressing or "current down" button 96.

In the preferred embodiment of the instant invention, the remote switching means incorporate and include an arc welder's helmet 80 of the type having eye protecting smoked glass 82. Such welding helmet 80 has an interior space 84 and has an interior neckline surface 84 which extends along a peripheral neckline flange 86. In the preferred embodiment, fob 92 is attached to such inner surface 88 close to the neckline flange 86 by means of an adhesive pad attachment or a "Velcro" hook and loop pad attachment 98. Positioning of the remote control fob 92 at the interior neckline portion of the helmet 80 ergonomically positions the fob 92 for ease of access and use by a welder wearing the helmet. Orientation of the fob 92 so that the current enhancing button 94 is situated upwardly from the current suppressing button 96 further ergonomically and mnemonically arranges the fob 92, the upward orientation of the "current up" button correlating position with function.

Upon an electronic or mechanical failure of the remote switching means, the turn handle 20 in combination with the slip clutch 62 operates as a manual override, restoring the function of the machine. Accordingly, turn handle 18 constitutes a manual override component.

In operation of the instant inventive arc welding assembly, and referring simultaneously to all figures, a welder wearing helmet 80 may wish to increase the amperage of his or her arc welding circuit. According to the function of the instant invention, the welder is advantageously relieved of any requirement of interrupting welding and walking to case 2 to manually turn and adjust turn handle 20. Instead, such welder may simply and ergonomically extend a finger behind helmet flange 86 and into space 84 to tactily access the current enhancing button 94 of fob 92, such button choice being mnemonically assisted by the button's preferred upward orientation. Upon pressing of button 94, a discreet radio signal is transmitted via antenna 24 and antenna lead 26 to the remote control receiver unit 40. Substantially simultaneously, such transmitter 40 communicates a motor actuating power pulse to motor 52, causing such motor to operate for a discreet, and preferably short time period. Such power pulse turns sprockets 56 and 58 a discreet and preferably small angular distance, incrementally upwardly adjusting the amperage delivered to the arc welding circuit. An alternative tactile depression of the current suppressing button 96 oppositely suppresses or reduces the arc welding current.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. An arc welding assembling comprising:
   (a) a case having a control panel plate, the control panel plate having a plurality of apertures, having a front side, and having a rear side;
   (b) a mounting plate, the mounting plate having a front side and having a rear side;
   (c) first mounting means interconnecting the control panel plate and the mounting plate, the first mounting means positioning the mounting plate rearwardly from the control panel plate to define a drive linkage space between the control panel plate and the mounting plate, the drive linkage space having front and rear ends, the rear and front sides of the control panel and mounting plates respectively bounding the front and rear ends of the drive linkage space;
   (d) a rotary selection rheostat mounted upon the mounting plate, said rheostat having an axle extending forwardly through the drive linkage space;
   (e) an electric motor supported upon the mounting plate, the electric motor having a rotary output positioned within the drive linkage space;
   (f) a power transfer assembly within the drive linkage space, said assembly operatively interconnecting the rheostat's axle and the electric motor's rotary output; and
   (g) remote switching means connected operatively to the electric motor.

2. The arc welding assembling of claim 1 wherein the electric motor is reversible, and wherein the remote switching means comprise a combination of a battery powered two function radio transmitter and a reversing polarity remote control receiver, said combination's receiver being adapted for reversibly actuating the electric motor.

3. The arc welding assembly of claim 2 wherein the remote switching means further comprise a combination of a welder's helmet and a tactily actuatable remote control, said combination comprising the battery powered two function radio transmitter and transmitter mounting means, the third transmitter mounting means fixedly attaching the battery powered two function radio transmitter to the welder's helmet.

4. The arc welding assembly of claim 3 wherein the welder's helmet has a neckline inner surface, and wherein the transmitter mounting means ergonomically position the battery powered two function radio transmitter at said inner surface.

5. The arc welding assembly of claim 1 wherein the power transfer assembly comprises a combination of a pair of sprockets and roller chain.

6. The arc welding assembly of claim 5 wherein the electric motor's rotary output comprises a drive axle, and wherein the sprockets and roller chain combination comprises a slip clutch, said clutch operatively connecting one of said combination's sprockets with one of the axles among the rheostat's axle and the drive axle.

7. The arc welding assembly of claim 6 wherein the rheostat's axle further forwardly extends to protrude from one of the control panel plate's apertures, and further comprising a turn handle fixedly attached to said axle's forward end.

8. The arc welding assembly of claim 1 wherein the first mounting means comprise a plurality of spacer posts, each post among the plurality of spacer posts spanning between the control panel plate and the mounting plate.

9. The arc welding assembly of claim 8 wherein the plurality of rheostat mounting bolts interconnect the rotary selection rheostat and the mounting plate.

10. The arc welding assembly of claim 9 wherein the first mounting means' spacer posts comprise the plurality of rheostat mounting bolts.

11. The arc welding assembly of claim 2 wherein the remote switching means comprise a combination of an antenna and an antenna lead, said combination's antenna lead being connected operatively to the remote switching means' reversing polarity remote control receiver.

12. The arc welding assembly of claim 11 wherein the antenna lead extends through one of the control panel plate's apertures, and wherein the antenna is mounted at the case's exterior.

13. The arc welding assembly of claim 12 wherein the remote switching means' reversing polarity remote control receiver is mounted upon the mounting plate.

14. The arc welding assembly of claim 4 wherein the remote switching means' battery powered two function radio transmitter has a current enhancing function button and has a current suppressing function button.

15. The arc welding assembly of claim 14 wherein the transmitter mounting means mnemonically position the remote switching means' battery powered two function radio transmitter to upwardly orient said transmitter's current enhancing function button with respect to said transmitter's current suppressing function button.

\* \* \* \* \*